US008111679B2

(12) United States Patent
Tsutsui (10) Patent No.: US 8,111,679 B2
(45) Date of Patent: Feb. 7, 2012

(54) WIRELESS COMMUNICATION APPARATUS AND WIRELESS COMMUNICATION METHOD

(75) Inventor: Masafumi Tsutsui, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1170 days.

(21) Appl. No.: 11/889,907

(22) Filed: Aug. 17, 2007

(65) Prior Publication Data

US 2008/0051150 A1    Feb. 28, 2008

(30) Foreign Application Priority Data

Aug. 23, 2006  (JP) ................................. 2006-226653

(51) Int. Cl.
*H04B 7/216* (2006.01)
(52) U.S. Cl. ......... 370/342; 375/299; 375/267; 370/441
(58) Field of Classification Search .................. 370/342, 370/441; 375/299, 267
See application file for complete search history.

(56) References Cited

U.S. PATENT DOCUMENTS

| 5,585,803 | A | 12/1996 | Miura et al. | |
|---|---|---|---|---|
| 5,999,826 | A | 12/1999 | Whinnett | |
| 7,155,231 | B2* | 12/2006 | Burke et al. | 455/450 |
| 7,336,727 | B2* | 2/2008 | Mukkavilli et al. | 375/299 |
| 7,366,087 | B2* | 4/2008 | Lee et al. | 370/203 |
| 7,539,253 | B2* | 5/2009 | Li et al. | 375/260 |
| 2003/0185310 | A1 | 10/2003 | Ketchum et al. | |
| 2006/0056531 | A1 | 3/2006 | Li et al. | |
| 2007/0249296 | A1* | 10/2007 | Howard et al. | 455/101 |
| 2008/0108310 | A1* | 5/2008 | Tong et al. | 455/69 |

FOREIGN PATENT DOCUMENTS

| EP | 1079543 A | 2/2001 |
|---|---|---|
| JP | 7-170117 | 7/1995 |
| JP | 9-232848 | 9/1997 |
| JP | 10-117162 | 5/1998 |
| JP | 2002-368664 | 12/2002 |
| JP | 2005-522086 A | 7/2005 |
| WO | WO 03/090386 | 10/2003 |

OTHER PUBLICATIONS

Extended European Search Report dated May 8, 2008 with Communication issued in corresponding European Application No. 07114676.5-1246.
Japanese Patent Office "Notice of Rejection" issued for corresponding Japanese Patent Application No. 2006-226653, mailed Apr. 26, 2011. English translation attached.

* cited by examiner

*Primary Examiner* — Phuc Tran
(74) *Attorney, Agent, or Firm* — Myers Wolin, LLC.

(57) ABSTRACT

A wireless communication apparatus on the base station transmits beamformed multi-beam data to a wireless communication apparatus on the mobile station side using a multiple antennas. To obtain an expected directivity without gain reduction under the existence of phase variation in transmission circuits, the wireless communication apparatus on the base station is equipped with a code book that stores beamforming information, a precoder that reads the code book and performs processing to form a multi-beam pattern for the data, and a control unit that controls, based on feedback information, the reading of beamforming information from the code book for the compensation of phase variation.

9 Claims, 7 Drawing Sheets

WIRELESS COMMUNICATION APPARATUS AND WIRELESS COMMUNICATION METHOD

CROSS-REFERENCE TO RELATED APPLICATION

This application is based upon and claims the benefit of priority from the prior Japanese Patent Application No. 2006-226653, filed on Aug. 23, 2006, the entire contents of which are incorporated herein by reference.

BACKGROUND OF THE INVENTION

1. Field of the Invention

The present invention relates to wireless communication and transmission directivity.

2. Description of the Related Art

For the transmission and reception of data using multiple antennas, a beamforming technique has been employed. Beamforming transmits a single datum via multiple antennas imparting directivity by the multiple antennas by staggering phases on transmission.

Figure 9:
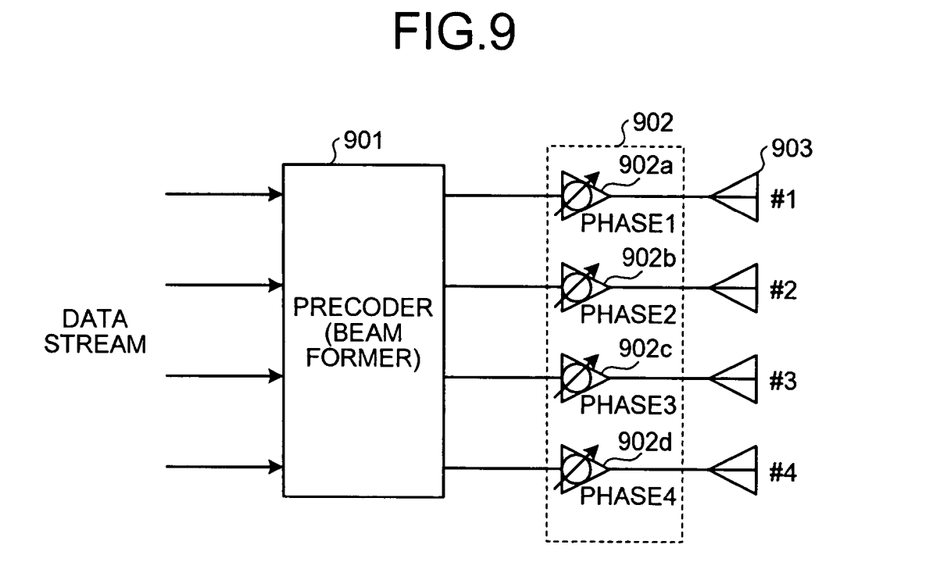
FIG. 9 is a schematic showing a conventional wireless communication apparatus.

FIG. 9 is a schematic showing a conventional wireless communication apparatus. FIG. 9 shows the partial configuration of the wireless communication apparatus on the base station side of a mobile communication system. Data from multiple channels (four channels shown in the figure) is input to a precoder 901, and each channel is given a fixed phase difference to form multiple beams. A transmitting unit 902 includes transmission circuits 902a to 902d for each channel, and transmits data via an antenna 903.

While the configuration shown in FIG. 9 is the configuration of a beamformer that attains a given directivity using the multiple antenna 903, a similar technique that transmits data by imparting phase differences to each channel exists, a multiple input multiple output (MIMO) technique, in which different data is transmitted by each channel (for example, Published Japanese translation of a PCT application No. 2005-522086).

In the configuration shown in FIG. 9, however, there is phase variation among the transmission circuits 902a to 902d for each channel of the transmitting unit 902. The existence of the phase variation causes, at the transmitting unit 902, distortion of the beam formed at the precoder 901, and expected directivity cannot be obtained.

Figure 10:
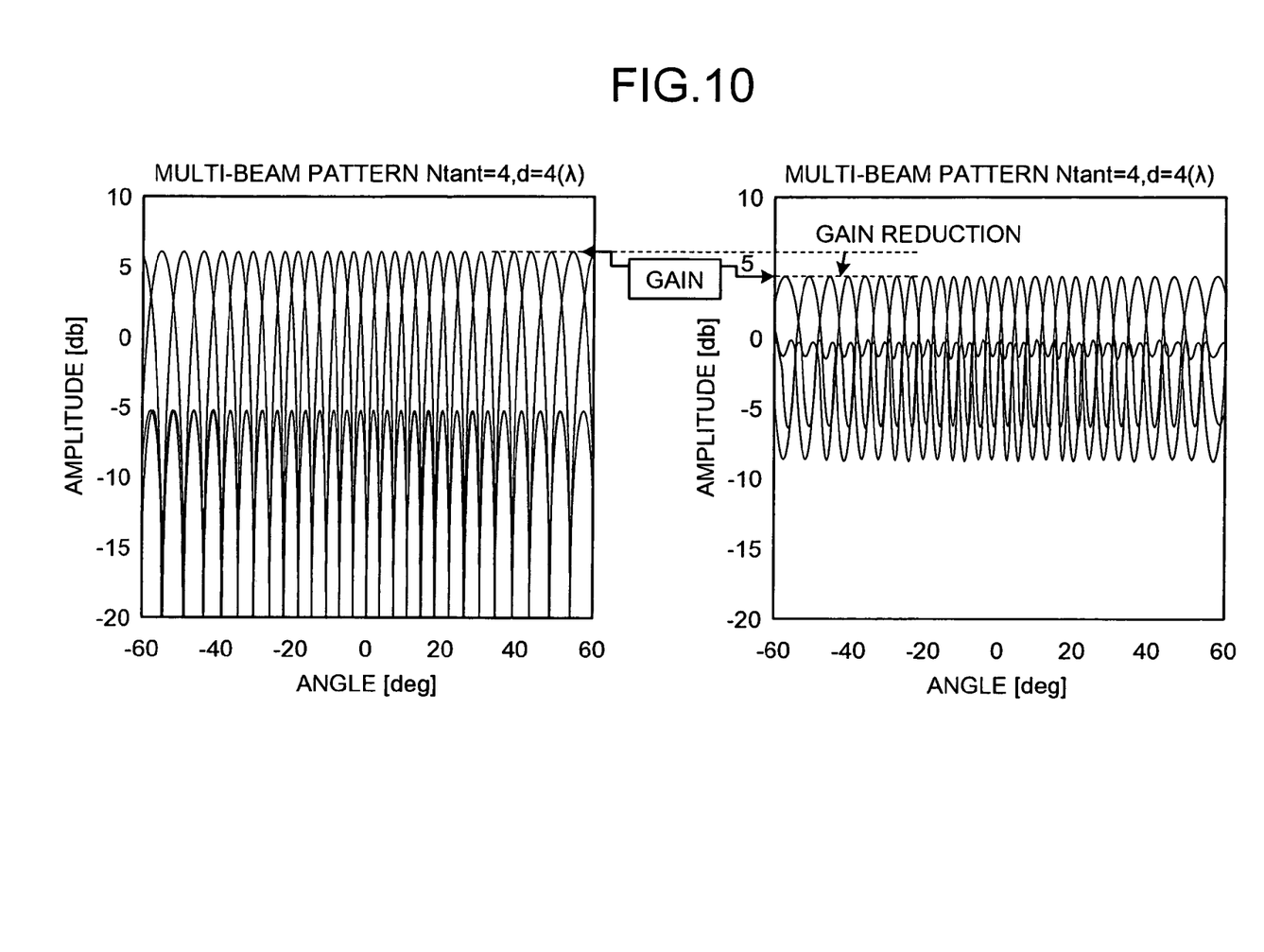
FIG. 10 illustrates gain reduction of multi-beam transmission.

FIG. 10 illustrates gain reduction of multi-beam transmission. As shown on the left side of the figure, under a condition in which there is no phase variation, expected directivity is obtained and transmission can be done with an improved gain (up to 6 decibels (dB)) by the effect of the multi-beam method. Inversely, in the case that phase variation exists in the transmission circuits 902a to 902d of the transmitting unit 902, directivity becomes inadequate, e.g., broaden, and the gains of each beam is reduced (down to 4 dB).

Therefore, in order to eliminate phase variation, phase adjustment has formerly been required so that phase variation does not occur by comparing the outputs of the transmission circuits 902a to 902d of the transmitting unit 902 and a reference signal using an external calibrator.

SUMMARY OF THE INVENTION

It is an object of the present invention to at least solve the above problems in the conventional technologies.

According to one aspect of the present invention includes, a wireless communication apparatus, on a base station side, that performs beamforming and transmits data to a mobile station using a plurality of antennas, includes a code book that stores beamforming information; a precoder that reads the code book and performs processing to form a multi-beam pattern for the data; and a control unit that, based on feedback information for a compensation of a phase variation in each transmission circuit of a plurality of transmission circuits that each respectively corresponds to a channel, controls a retrieval of the beamforming information that compensates the phase variation.

According to another aspect of the present invention, a wireless communication apparatus, on a mobile station side, that receives a plurality of beams of data from a base station using a plurality of antennas, includes a code book that stores beamforming information identical to that stored in a code book of the base station; and a control unit that, when notified that a phase variation compensation is required by the base station, searches the beamforming information, based on a signal condition of each of the beams, for the beamforming information that enables optimal beamforming, and transmits the selected beamforming information to the base station as feedback information.

According to still another aspect of the present invention, a wireless communication method, on a base station side, of performing beamforming and transmitting data to a mobile station using a plurality of antennas, includes reading beamforming information stored in a code book; forming a multi-beam pattern for the data; and retrieving, based on feedback information for a compensation of a phase variation in each transmission circuit of a plurality of transmission circuits that each respectively correspond to a channel, the beamforming information to compensate the phase variation.

According to yet another aspect of the present invention, a wireless communication method of a wireless communication apparatus on a mobile station side that, using a plurality of antennas, receives a plurality of beams of data from a base station, includes searching, based on a signal condition of each of the beams when notified that a phase variation compensation is required by the base station, a code book for beamforming information that enables optimal beamforming, the code book storing beamforming information identical to that in a code book provided in the base station; and transmitting the beamforming information that enables optimal beamforming to the base station as feedback information.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Referring to the accompanying drawings, exemplary embodiments according to the present invention are explained in detail below.

Figure 1:
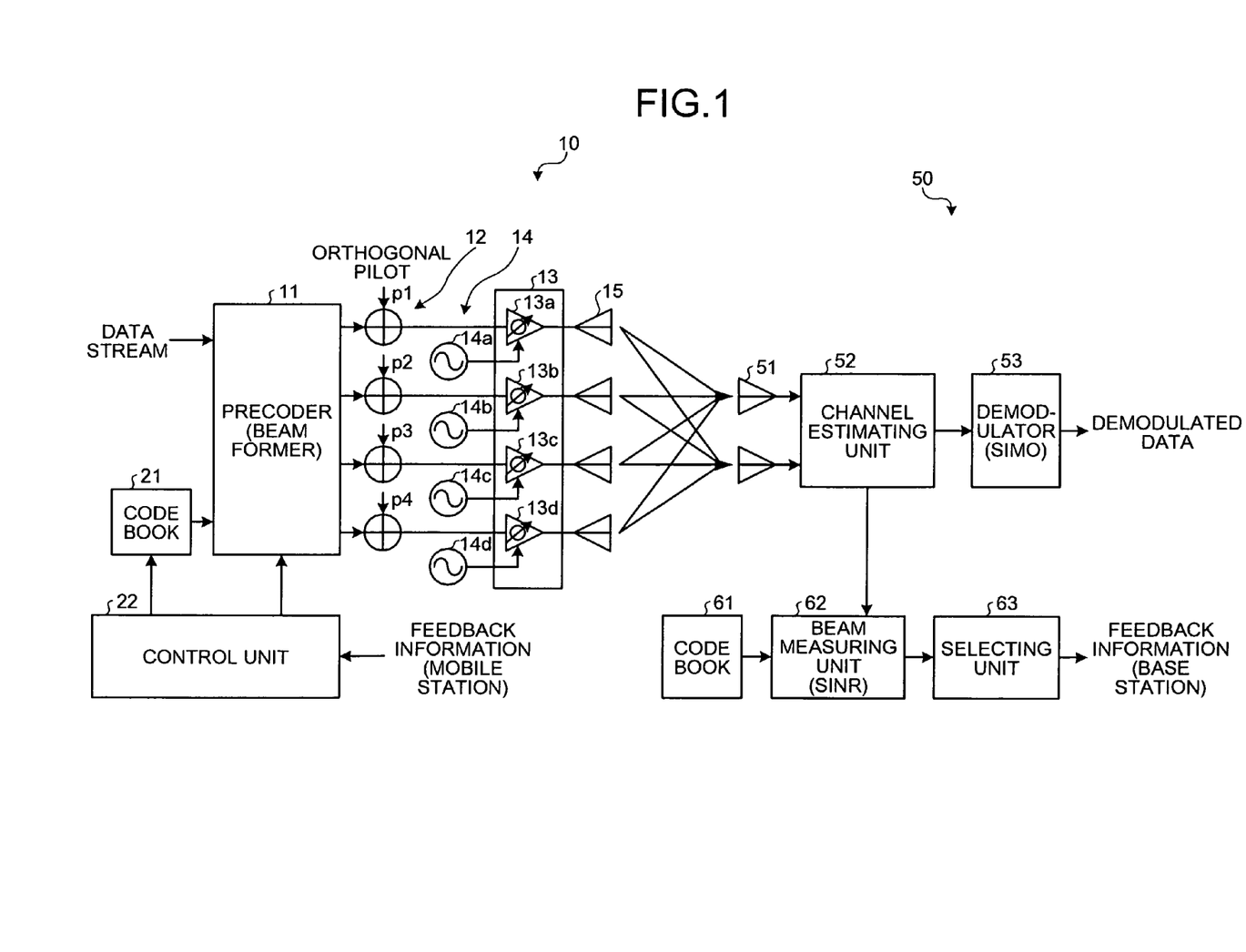
FIG. 1 is a schematic showing the configuration of wireless communication apparatuses according to a first embodiment of the present invention.

FIG. 1 is a schematic showing the configuration of wireless communication apparatuses according to a first embodiment of the present invention. Wireless communication apparatuses 10 and 50 of a base station (transmitter) and of a mobile station (receiver), respectively, are shown of mobile communication system.

The wireless communication apparatus 10 on the base station side is explained. Data (data stream) for multiple channels (four channels shown in the figure) is input to a precoder 11, and given phase differences are assigned to each channel to form multiple beams. A code book 21 stores 16-way (equal to the number of combination of indices) compensation values to give weights to the data of each channel according to the multi-beam pattern.

The pilot signal of an orthogonal component (orthogonal pilot) is individually added to the output data of each channel of the precoder 11 by an adding unit 12. A transmitting unit 13 includes transmission circuits 13a to 13d for individual channels, and modulates data at the oscillation frequency (RF) of an oscillator 14 (14a to 14d) and outputs the data via multiple antennas 15.

A control unit 22 compensates phase variation based on the data input by the wireless communication apparatus 50 of a mobile station and selects a compensation value from the code book 21 and inputs the value to the precoder 11 to compensate phase variation.

The wireless communication apparatus 50 on the mobile station side is explained. Data received through multiple channels (two channels shown in the figure) via antennas 51 is input to a channel estimation unit 52, and the channel estimation unit 52 estimates the channels using orthogonal pilot components included in the transmitted data, and a demodulator 53 demodulates stream data and outputs demodulated data. Although the system shown in FIG. 1 is the example of single input multiple output (SIMO) configuration, it can be applied similarly to an MIMO system.

The wireless communication apparatus 50 on the mobile station side is also equipped with a code book 61 that contains the same contents as that on the base station side. A beam measuring unit 62, based on channel values estimated by the channel estimating unit 52 and the contents of the code book 61, alters estimated channel values necessary for the compensation of the variation in the received beams. At this time, a beam indicating the maximum signal to interference plus noise ratio (SINR) (signal to interference ratio (SIR)) is measured, and the optimal transmission beam and the number of streams are selected by a selecting unit 63, and the information is fed back to the wireless communication apparatus 10 of the base station. Feedback information only includes the transmission beam and the number of streams, and thus can easily be transmitted to the base station side without compressing the band of an upstream transmission path. The beam measuring unit 62 and the selecting unit 63 constitute a control unit in the wireless communication apparatus 50 on the mobile station side.

Figure 2:
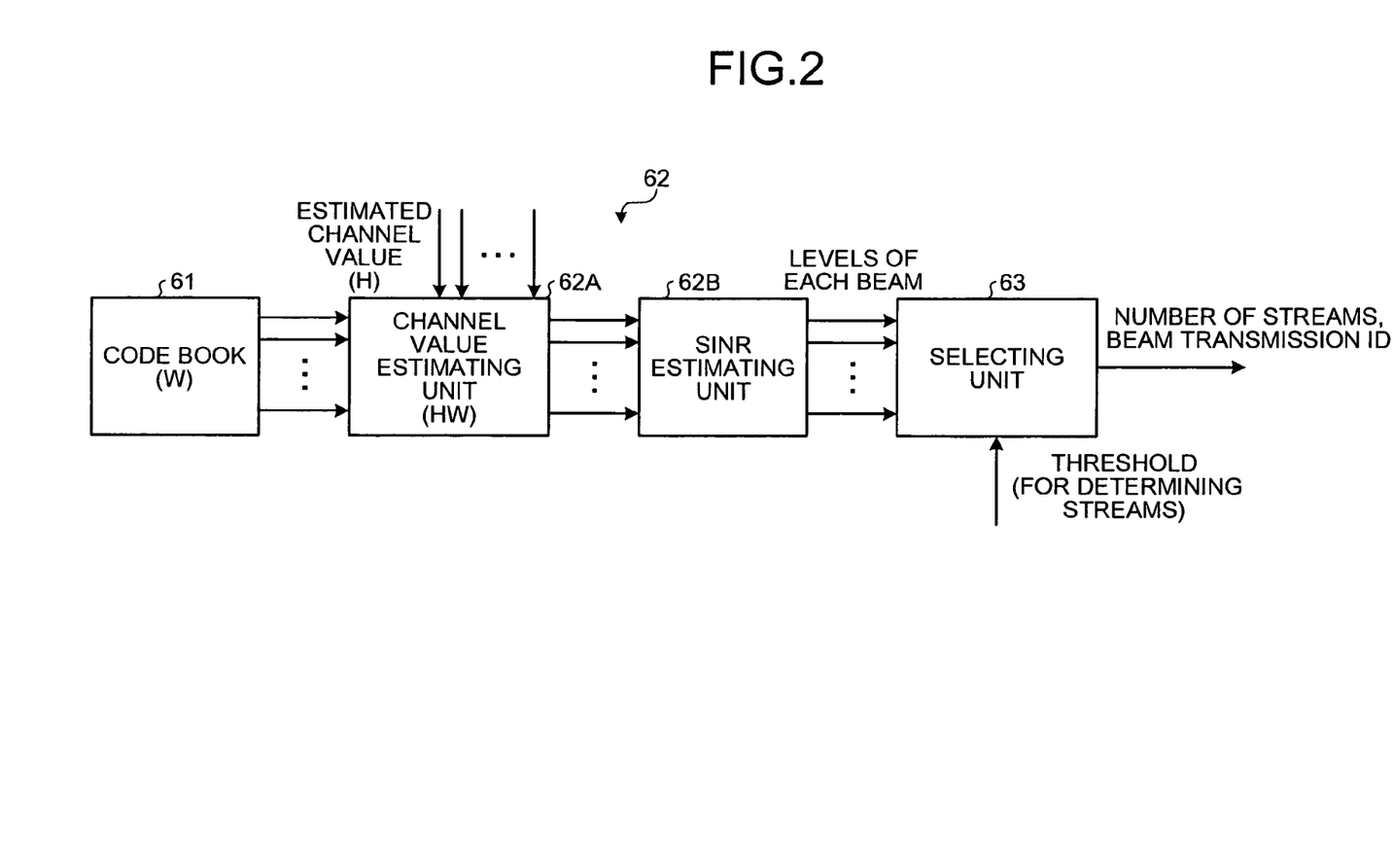
FIG. 2 is a schematic showing detailed configuration of the beam measuring unit shown in FIG. 1.

FIG. 2 is a schematic showing detailed configuration of the beam measuring unit shown in FIG. 1. The beam measuring unit includes a channel value estimating unit 62A and an SINR estimating unit 62B. The channel value estimating unit 62A computes an estimate channel value HW for each beam based on an estimate channel value H output by the channel estimating unit 52 and a weight W set in the code book 61. The SINR estimating unit 62B estimates the level, e.g., SINR, of each beam using the estimate channel value HW of each beam. The estimation can be done not only by SINR but also by signal power.

The selecting unit 63 compares the level of each beam with a threshold value, and ranks the beams in ascending order of level. Transmission beam identifiers (ID's), which are assigned to each high ranking beam, and the determined number of streams are transmitted as feedback information to the wireless communication apparatus 10 on the base station side.

The code books 21 and 61 include weights to form the beam pattern of multiple beams and to compensate phase variation. The weight W for multi-beam generation is expressed by the following equation 1 (j and −j are imaginary numbers).

$$W = [w_1 \ w_2 \ w_3 \ w_4] = \frac{1}{2}\begin{bmatrix} 1 & 1 & 1 & 1 \\ 1 & -j & -1 & j \\ 1 & -1 & 1 & -1 \\ 1 & j & -1 & -j \end{bmatrix} = W(0,0) \quad (1)$$

As code book information for precoding, the weight W is defined from W(0, 0) to W(3, 3) in the following sixteen ways according to combinations of the index numbers: W(0, 0), W(0, 1), W(0, 2), W(0, 3), W(1, 0), W(1, 1), W(1, 2), W(1, 3), W(2, 0), W(2, 1), W(2, 2), W(2, 3), W(3, 0), W(3, 1), W(3, 2), W(3, 3).

A code book to obtain high gains is prepared by compensating phase variations existing in the channels of the transmission circuits 13a to 13d of the transmitting unit 13. In the case of four indices as the above, when a 4×4 diagonal matrix is described as $D(m_3, m_4)$ and the phase difference is ninety degrees, the matrix is expressed as equation 2. By assigning the two of four matrix arrangements that are diagonally arranged from the upper left to the lower right, as 1 and 1, virtual straight lines positioned at angles differing by 90° are created. Terms for approaching the virtual straight line are $\phi(m_3)$ and $\phi(m_4)$ $$D(m_3, m_4) = \begin{bmatrix} 1 & 0 & 0 & 0 \\ 0 & 1 & 0 & 0 \\ 0 & 0 & \phi(m_3) & 0 \\ 0 & 0 & 0 & \phi(m_4) \end{bmatrix}, \quad (2)$$

$m_3, m_4 = 0, 1, 2, 3,$ $\phi(m) = \exp(j\frac{\pi}{2}m)$

Equation 3 is computed by normalizing the diagonal matrix after discrete Fourier transform (DFT) and Hermitian transposition.

$$W(m_3, m_4) = \text{DFT}[D(m_3, m_4)]^H/\sqrt{4} \quad (3)$$

H: Hermitian transposition

As a result, a unitary matrix for precoding is obtained and is stored in the code books 21 and 61.

Consequently, the beam measuring unit 62 of the wireless communication apparatus 50 on the reception side, using the code book 61, computes the following equation 4, where phase terms to compensate phase variation are added to a third and a fourth antenna of the antennas 15 for transmission.

$$W = [\, w_1 \;\; w_2 \;\; w_3 \;\; w_4 \,] = \qquad (4)$$

$$\frac{1}{2}\begin{bmatrix} 1 & 1 & 1 & 1 \\ 1 & -j & -1 & j \\ 1 \cdot \phi^*(m_3) & -1 \cdot \phi^*(m_3) & -1 \cdot \phi^*(m_3) & -1 \cdot \phi^*(m_3) \\ 1 \cdot \phi^*(m_4) & j \cdot \phi^*(m_4) & -1 \cdot \phi^*(m_4) & -j \cdot \phi^*(m_4) \end{bmatrix}$$

*: complex conjugate

The beam number wi of the maximum SINR and the phase number thereof (matrix number) $m_3$ and $m_4$ are obtained and are transmitted as feedback information to the wireless communication apparatus 10 on the base station side.

Figure 3:
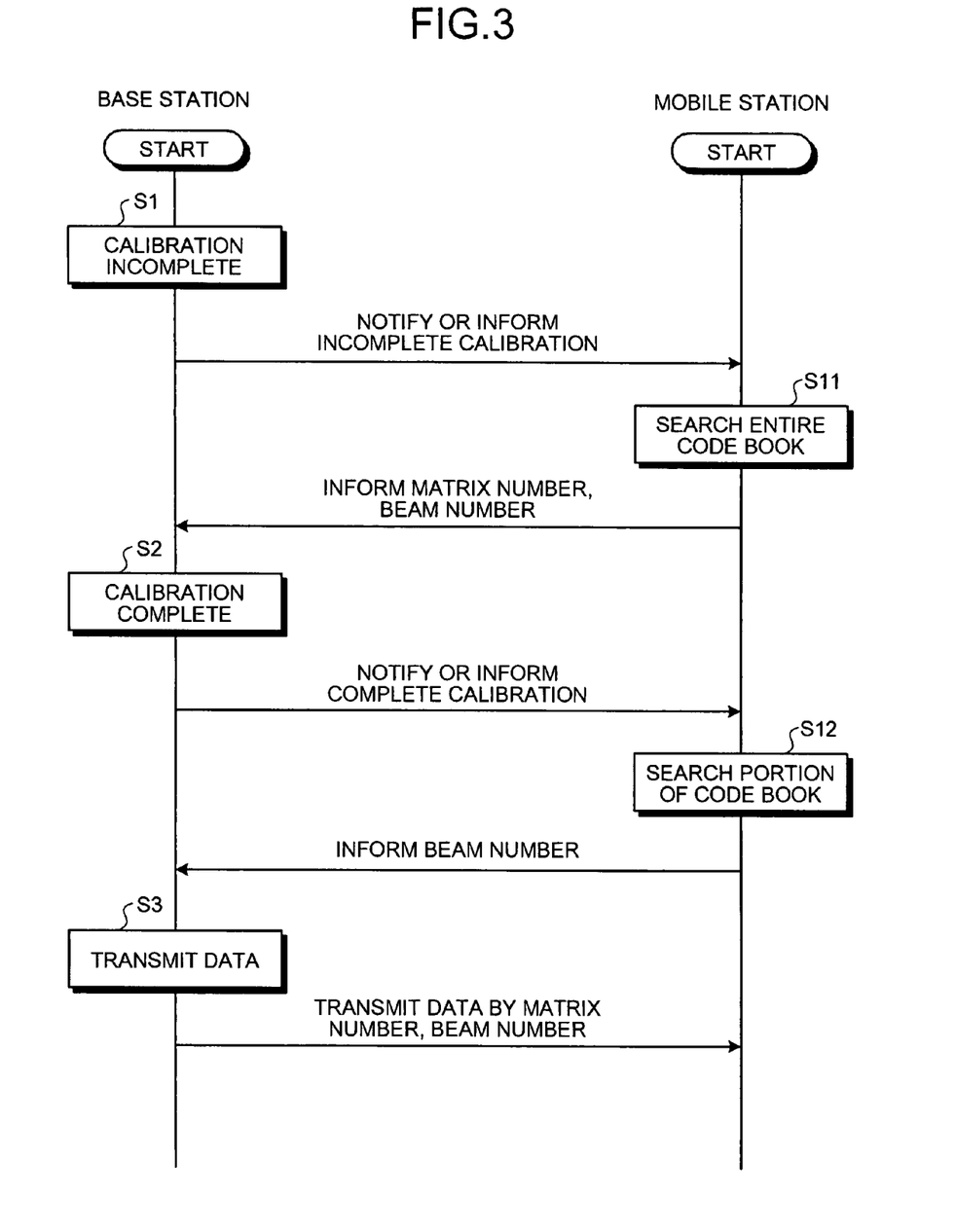
FIG. 3 is a flowchart showing processes related to phase variation compensation.

FIG. 3 is a flowchart showing processes related to phase variation compensation. Processes by wireless communication apparatuses of both a base and a mobile station are shown.

Figure 4:
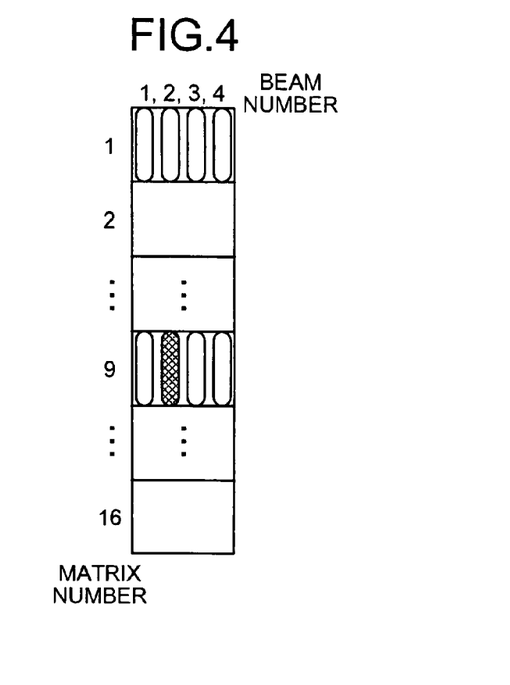
FIG. 4 is a schematic showing a state of a code book during the search.

The base station notifies or informs the mobile station of incomplete calibration if calibration for phase variation compensation is not completed (step S1). Receiving the notification or information, the mobile station searches the entire code book 61 (step S11). FIG. 4 is a schematic showing a state of a code book during the search. The entire 16-way code book is searched.

The mobile station then informs the base station of a matrix number as the result of the search for phase variation compensation and a beam number based on beam measurement by the beam measuring unit 62 as feedback information. FIG. 4 shows an example in which matrix number nine and beam number two are reported.

The base station completes calibration based on the feedback information (step S2). At this time, a matrix number and a beam number indicated by the feedback information are read from the code book 21 and are input to the precoder 11, and thus optimum beamforming can be performed. The base station notifies or informs the mobile station of the completion of calibration.

Figure 5:
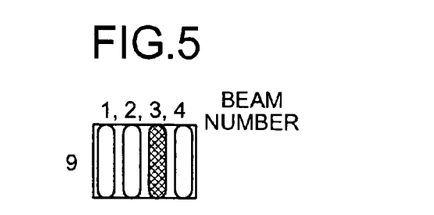
FIG. 5 is a schematic showing the state of a code book during a partial search.

After calibration is completed, the mobile station performs a partial search of the code book 61 (step S12). FIG. 5 is a schematic showing the state of a code book during a partial search, "partial" meaning searching for a beam number within the matrix number nine that is obtained by the search of an entire code book. Once phase variation is compensated, only the search of an optimum beam number that constantly indicates the maximum SINR is required without searching an entire code book. FIG. 5 shows an example in which beam number three (search result) is reported to the base station.

Subsequently, the base station transmits data (step S3). At this time, the data transmission is performed using the matrix number and beam number reported by the mobile station and one cycle of the process is thus completed.

Figure 6:
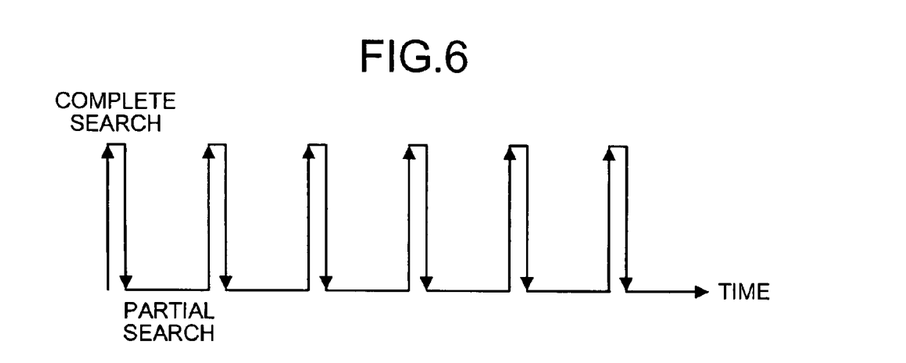
FIG. 6 is a timing chart showing the transition of searching status.

FIG. 6 is a timing chart showing the transition of searching status. After the search of the entire code book 61 (step S11), only partial searching (step S21) needs to be performed at a fixed time intervals. It is not necessary to search the entire code book 61 at every calibration process, and thus time for partial searching can be increased. In this way, the search process of the code book 61 in the wireless communication apparatus 50 on the mobile station side can be simplified, and the processing load involved in the search can be reduced.

According to the first embodiment, the phase variation of each transmission circuit 13a to 13d of the transmitting unit 13 in the wireless communication apparatus 10 of the base station is compensated on the base station side using the feedback information that is output by the wireless communication apparatus 50 of the mobile station based on the receiving condition. The compensation of phase variation can be performed simply without any specific calibration circuit.

Figure 7:
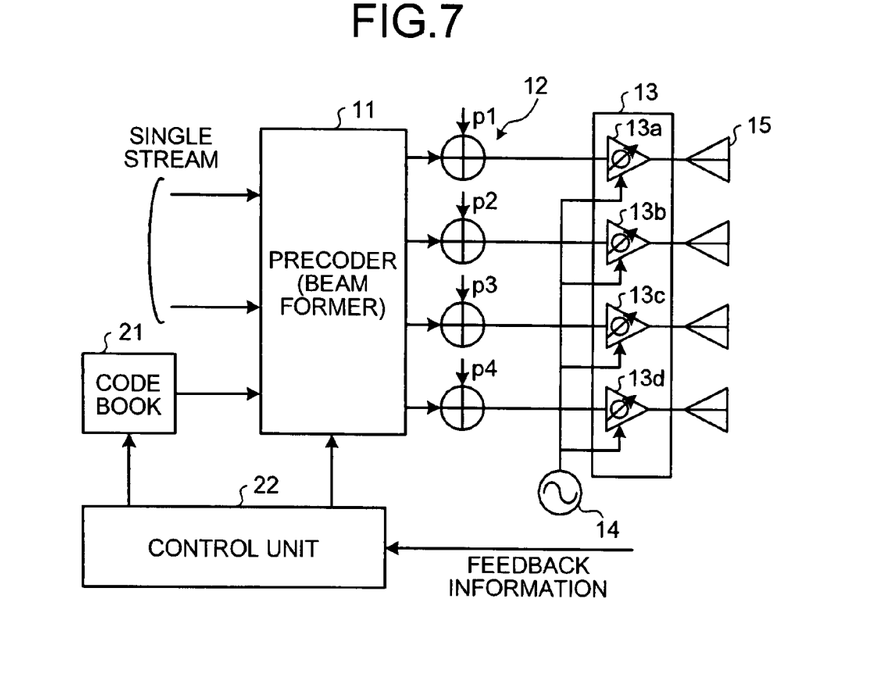
FIG. 7 is a schematic of a wireless communication apparatus according to a second embodiment of the present invention.

FIG. 7 is a schematic of a wireless communication apparatus according to a second embodiment of the present invention. A single oscillator, an oscillator 14, is connected to the multiple channels of the transmitting unit 13, differentiating the apparatus from that of FIG. 1 according to the first embodiment. The oscillator 14 supplies a local signal that is common to each transmission circuit of the transmitting unit 13. Therefore, phase variation among the transmission circuits 13a to 13d is not generated.

Figure 8:
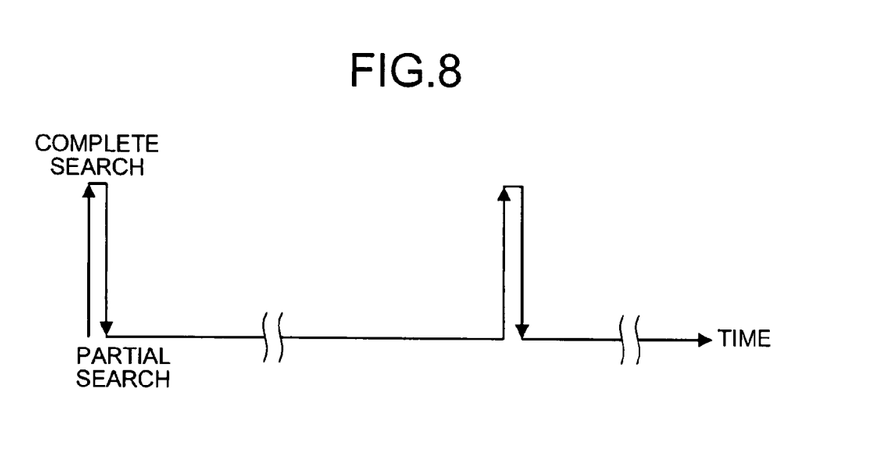
FIG. 8 is a timing chart showing search status transition.

FIG. 8 is a timing chart showing search status transition. According to the second embodiment, the same process as shown in FIG. 3 is also performed by the wireless communication apparatus 50 on the mobile station side. Similarly, a partial search (step S21) is performed after the entire code book 61 is searched (step S11) at the mobile station.

According to the second embodiment, as the oscillator 14 supplies the transmitting unit 13 with a common local signal and thus phase variations among channels are not induced, a single search of the entire code book 61 at a calibration process is sufficient. After a single search of the entire code book 61 is performed, the duration of the partial search can be longer (the relative proportion of the partial search time can be increased) compared to the first embodiment. Search of the entire code book 61 at fixed time intervals (for example, thirty-minute cycles) based on temperature shift, and compensation, also at a fixed time intervals based on temperature shift, of phase variation induced at the transmitting unit 13 may be performed. The wireless communication apparatus 50 on the mobile station side recognizes, by information transmitted from the base station side, that the transmitting unit 13 of the wireless communication apparatus 10 on the base station side has a configuration employing a common local signal.

According to the second embodiment, a single oscillator, the oscillator 14, supplies a common local signal to each of the transmission circuits 13a to 13d of the transmitting unit 13 in the wireless communication apparatus 10 of the base station, and phase variation is compensated on the base station side using the feedback information that is output by the wireless communication apparatus 50 of the mobile station based on the receiving condition. As compensation of phase variation can be performed simply without any specific calibration circuit, the search cycle of an entire code book can be increased, and the partial search time can be relatively increased. Furthermore, simplification of the configuration and reduction of the processing load to the mobile station can be realized.

Although each embodiment above is explained with the example of an SIMO configuration that receives data input by a single user as a single stream, performs beamforming to transmit the data in multiple beams. The embodiments can also be applied to an MIMO configuration that receives multi-stream data input by multiple users, and transmits the data by multiple beams.

The method related to the wireless communication explained in the present embodiments can be realized by executing a prepared program on a computer, such as a personal computer or work station. The program is recorded on computer-readable recording medium such as a hard disk, flexible disk, compact disk read-only memory (CD-ROM), magneto optical disk (MO), or digital versatile disk (DVD), and is read and executed by a computer. The program can be a transmittable medium that can be distributed via networks, such as the internet.

The wireless communication apparatus according to the embodiments effects improvement of gain on the mobile station side and expected multi-beam directivity by compensating phase variation with a simple configuration to merely control the reading of optimum code book on the base station side without any specific calibrator.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A wireless communication system comprising:
    a code book that stores beamforming information identical to that stored in a code book of a base station from which a plurality of beams of data using a plurality of antennas are received from on a mobile station side;
    a precoder that reads the code book and performs processing to form a multi-beam pattern for data being beamformed and transmitted to the mobile station using the plurality of antennas on the base station side; and
    a control unit that, based on feedback information for a compensation of a phase variation in each transmission circuit of a plurality of transmission circuits that each respectively corresponds to a channel, controls a retrieval of the beamforming information that compensates the phase variation and, when notified that a phase variation compensation is required by the base station, searches the beamforming information, based on a signal condition of each of the beams, for the beamforming information that enables optimal beamforming, and transmits the selected beamforming information to the base station as the feedback information, wherein
    the control unit performs a complete search of the code book, entirely, for a beam number and a matrix number, and transmits the beam number and the matrix number to the base station as the feedback information, and
    after the complete search is performed, the control unit performs a partial search of a portion of the code book and transmits, as the feedback information, an optimal beam number in a matrix indicated by the matrix number.

2. The wireless communication system according to claim 1, wherein
    the control unit retrieves the matrix number and the beam number from the code book.

3. The wireless communication system according to claim 1, wherein
    the transmission circuits modulate the data using a plurality of oscillators, each oscillator being respectively disposed for each channel.

4. The wireless communication system according to claim 1, wherein
    the transmission circuits modulate the data using a single oscillator.

5. The wireless communication system according to claim 1, wherein
    the beam number corresponding to a beam that has a high signal to interference plus noise ratio or a high signal power among the received beams.

6. The wireless communication system according to claim 1, wherein
    when a plurality of transmitting circuits disposed on the base station are configured to modulate data using a single oscillator, the control unit sets a longer cycle of the complete search corresponding to a period during which the transmitting circuits are affected by temperature shifts, the longer cycle relative to a cycle of the complete search when the transmitting circuits modulate data using a plurality of oscillators.

7. A wireless communication method comprising:
    reading beamforming information stored in a code book, the beamforming information identical to that stored in a code book of a base station from which a plurality of beams of data using a plurality of antennas are received from on a mobile station side;
    forming a multi-beam pattern for data being beamformed and transmitted to the mobile station using the plurality of antennas on the base station side;
    retrieving, based on feedback information for a compensation of a phase variation in each transmission circuit of a plurality of transmission circuits that each respectively correspond to a channel, the beamforming information to compensate the phase variation;
    when notified that a phase variation compensation is required by the base station, searching the beamforming information, based on a signal condition of each of the beams, for the beamforming information that enables optimal beamforming; and
    transmitting the selected beamforming information to the base station as the feedback information,
    wherein the searching and transmitting includes
    performing a complete search of the code book, entirely, for a beam number and a matrix number, and transmitting the beam number and the matrix number to the base station as the feedback information, and
    after the complete search is performed, the control unit performs a partial search of a portion of the code book and transmits, as the feedback information, an optimal beam number in a matrix indicated by the matrix number.

8. The wireless communication method according to claim 7, further comprising:
    modulating the data using a plurality of oscillators, each oscillator being respectively disposed for each channel.

9. The wireless communication method according to claim 7, further comprising:
    modulating the data using a single oscillator.

* * * * *